United States Patent
Baudesson et al.

(10) Patent No.: US 7,505,293 B2
(45) Date of Patent: Mar. 17, 2009

(54) DEVICE AND METHOD FOR CONTROLLING ELECTRIC POWER CONVERTER

(75) Inventors: Philippe Baudesson, La Buisse (FR); Philippe Delarue, Roncq (FR); Philippe Le Moigne, Nomain (FR); Patrick Bartholomeus, Hellemmes (FR); Xavier Cimetiere, Toufflers (FR)

(73) Assignee: MGE UPS Systems, Saint-Ismiers Cedex (FR)

( * ) Notice: Subject to any disclaimer, the term of this patent is extended or adjusted under 35 U.S.C. 154(b) by 350 days.

(21) Appl. No.: 11/350,841

(22) Filed: Feb. 10, 2006

(65) Prior Publication Data
US 2006/0187694 A1    Aug. 24, 2006

(30) Foreign Application Priority Data
Feb. 24, 2005   (FR) .................................. 05 01888

(51) Int. Cl.
*H02M 7/5387* (2007.01)
*H02M 1/12* (2006.01)
(52) U.S. Cl. ............................ 363/132; 363/41; 363/98
(58) Field of Classification Search ................... 363/37, 363/40, 41, 45, 46, 47, 48, 56.02, 98, 132
See application file for complete search history.

(56) References Cited

U.S. PATENT DOCUMENTS

| 5,361,196 | A | | 11/1994 | Tanamachi et al. | |
|---|---|---|---|---|---|
| 5,594,634 | A | * | 1/1997 | Rajashekara et al. | 363/98 |
| 5,627,742 | A | | 5/1997 | Nakata et al. | |
| 5,757,636 | A | * | 5/1998 | Fletcher | 363/98 |
| 6,842,354 | B1 | | 1/2005 | Tallam et al. | |

FOREIGN PATENT DOCUMENTS

| EP | 0 571 755 A3 | 12/1993 |
|---|---|---|
| EP | 0 642 212 A1 | 3/1995 |

* cited by examiner

*Primary Examiner*—Jessica Han
(74) *Attorney, Agent, or Firm*—Steptoe & Johnson LLP

(57) ABSTRACT

The control device of an electric power converter comprises a control device controlling turn-on of semi-conductor legs. The converter comprises DC voltage power supply lines on three levels with two filtering capacitors. The control device supplies modulation signals of control signals of said legs. The control device comprises a regulating circuit to regulate the voltage variation of intermediate voltage via a general control component. The general control component is determined according to modulation signals, to signals representative of DC voltage and to signals representative of currents to take part in regulation of the intermediate voltage. The method processes voltage variation regulation via the general control component.

15 Claims, 10 Drawing Sheets

DEVICE AND METHOD FOR CONTROLLING ELECTRIC POWER CONVERTER

BACKGROUND OF THE INVENTION

The invention relates to a control device of an electric power converter comprising control means controlling turn-on of power semi-conductor legs. The electric power converter has a DC power supply with a positive voltage line, a negative voltage line, and an intermediate voltage line. The voltage lines are all connected to a common point of filtering capacitors. The electric power converter has conversion means having at least three legs connected between the positive, negative or intermediate voltage lines. The conversion means also has outputs to supply at least one output voltage. Control means turn the legs of the conversion means on and off. The control means have a processing means that supply modulation signals of control signals to the legs.

The invention also relates to an electric power converter comprising such a control device.

The invention also relates to a method for controlling such a converter.

STATE OF THE ART

Known converter control devices control commutation legs with power semi-conductors to supply output voltages supplying a load. When the converters are of the three-level type like the one represented in FIG. 1, legs of the converter are connected between a line L1 of positive voltage V1, a line L2 of negative voltage V2 and a line L0 of intermediate voltage V0, and outputs S123. The intermediate voltage line L0 is connected to a common point of two DC voltage filtering capacitors C1 and C2 connected in series between the line L1 and the line L2. In the diagram of FIG. 1, a first leg 20 comprises semi-conductors 20A, 20B, 20C, 20D respectively connected between the line L1 of positive voltage V1 and a first common point receiving the intermediate voltage V0 via a first diode D20A, between the first common point and a first output S123, between the first output and a second common point receiving the intermediate voltage V0 via a second diode D20B connected in the reverse direction to the diode D20A, and between the second common point and the line L2 of negative voltage V2. The other legs 21 and 22 are connected in the same way, and they respectively comprise semi-conductors 21A, 21B, 21C, 21D and 22A, 22B, 22C, 22D, first diodes D21A and D22A, and second diodes D21B and D22B. A control circuit 6 commands turn-on or turn-off of the semi-conductors of the legs to supply voltages feeding loads or an electric power system on output S123. Measuring means 8 supply measurement signals IS and VS representative of output electric quantities for example current and/or voltage signals. If the voltage of the mid-point is also controlled by the control circuit, measuring means 8 supply values of said voltage or of the current flowing in the capacitor bridge C1 and C2. As the converter is a three-level converter, the semi-conductors are controlled by half-arms. For example, couples of half-arms 20A-20B, 21A-21B and 22A-22B supply a positive or intermediate voltage and couples of half-arms 20C-20D, 21C-21D and 22C-22D supply a negative or intermediate voltage.

In a control circuit 6 of the prior art, a first channel controls half-arms on the positive voltages side and a second channel controls half-arms on the negative voltages side.

FIG. 2 shows an example of a part of a processing unit 7 of a control circuit 6 to supply control signals of the legs. In this circuit, a regulator 8 enables three-phase modulation signals to be regulated and supplied according to reduced setpoints Cd, Cq, Co, in particular by a Park or Concordia transform in the dqo or αβo domains. These known transforms and rotations are generally computed by means of matrices respectively called Park and Concordia matrices. Signals MC1 for each phase on output of the regulator are preferably used for intersective type modulation on a triangular high-frequency carrier signal enabling pulse width modulation to be performed. In the diagram of FIG. 2, the regulator 8 supplies first three-phase modulation signals MC1, a module 11 applies a reference voltage V2 to said signals MC1 by operators 12, and one or two modules 13 supply a high-frequency signal designed to be modulated by modulation signals MC2 modified by operators 12. Operators 14 combine the modulation signals MC2 with preferably triangular high-frequency signals F1 to supply control signals CVP and CVN of the inverter legs 20, 21, 22 in pulse width modulation format and operating on three voltage levels. As the leg controls are preferably binary on-off commands, conditioning circuits 16 shape the control signals. The reference signal V2 is generally representative of a DC voltage, for example half of the voltage VDC of the lines L1 and L2 or of the intermediate voltage.

Known control devices control the common point voltage of the capacitors in a slow manner. This type of control implies capacitors of very high values to guarantee an acceptable voltage variation of the intermediate voltage. With this type of control, the positive and negative voltages are also over-dimensioned to compensate losses in power semi-conductors. Moreover, the type of control of known devices is incompatible with the use of an over-modulation enabling the losses to be reduced.

SUMMARY OF THE INVENTION

The object of the invention is to provide a device and a method for controlling a converter enabling improved regulation of the intermediate voltage and enhanced control of the converter legs, and also to provide a converter comprising one such device.

In a control device according to one embodiment, the control means comprise regulating means in conjunction with means for determining a general control component;

voltage signal inputs to supply the regulating means with signals representative of voltages between positive, negative and intermediate voltage lines, or of the variations of the intermediate voltage; and current signal inputs to supply the regulating means with current signals representative of output currents of the converter legs.

The regulating means determine the general control component according to the modulation signals to said signals representative of voltages and to said signals representative of currents to take part in regulation of the intermediate voltage.

Preferably, the regulating means comprise a first regulating module processing a first combination of modulation signals and of output currents, the general control component being dependent on a signal representative of the first combination and a signal representative of a variation of the intermediate voltage.

Advantageously, the regulating means comprise a second regulating module processing a second combination of squared modulation signals and of output currents, the general control component being dependent on a signal representative of a quotient between a difference of the second combination with respect to a signal representative of a variation of the intermediate voltage and the first combination.

Advantageously, the regulating means comprise a module for detecting the sign of a result of the first combination, the general control component being dependent on a signal representative of a product between a signal representative of said sign and a signal representative of a variation of the intermediate voltage.

In a preferred embodiment, the means for determining the general control component comprise over-modulation control means to supply a general control component comprising mid-point voltage regulation signals and over-modulation control signals.

Preferably, the over-modulation control signals comprise means for controlling signal priority, regulating signals taking priority over over-modulation signals.

Preferably, the over-modulation control means position the semi-conductors of the legs during over-modulation to supply a voltage according to a first voltage value corresponding to the voltage of the positive line, a second voltage value corresponding to the voltage of the negative line, or a third voltage value corresponding to the mid-point voltage.

Advantageously, the over-modulation control means position the semi-conductors of the legs during over-modulation according to a modulation signal the closest to signals representative of the first positive voltage, of the second negative voltage, or of the intermediate voltage.

Advantageously, the over-modulation control means position the semi-conductors of the legs during over-modulation according to a modulation signal modified by a regulation signal, the modified modulation signal being the closest to signals representative of the first positive voltage, of the second negative voltage, or of the intermediate voltage.

Preferably, the over-modulation control means include means for controlling modulation signal saturation risks.

An electric converter according to the invention may comprise a control device having control means controlling turn-on of power semi-conductor legs;
a DC power supply comprising a first positive voltage line, a second negative voltage line, and a third intermediate voltage line connected to a common point of filtering capacitors connected to the first line and to the second line; and
conversion means having at least three legs connected between the positive, negative and intermediate voltage lines and outputs to supply at least one output voltage.

Control means control the legs of the conversion means according to modulation signals comprising general control component signals.

The control means may comprise at least one control device and current measuring means arranged on output conductor lines and connected to the control device to supply signals representative of currents to means for determining the general control component and to regulating means to be used to determine the general control component regulating the intermediate voltage.

A method for controlling an electric power converter may comprise determining a general control component according to modulation signals, signals representative of voltages, or of a voltage variation of the intermediate line and/or of the positive and negative voltage lines, and to signals representative of currents in output conductors, and
regulating the voltage variation of the intermediate line via the general control component.

Preferably, the general control component is also determined according to over-modulation processing.

Preferably, the general control component is determined with regulation of the intermediate voltage taking priority over over-modulation.

Advantageously, over-modulation processing is performed at three levels and applies selection of a closest modulation signal with respect to signals representative of the positive, negative or intermediate voltages.

BRIEF DESCRIPTION OF THE DRAWINGS

Other advantages and features will become more clearly apparent from the following description of particular embodiments of the invention given as non-restrictive examples only and represented in the accompanying drawings in which.

DETAILED DESCRIPTION OF PREFERRED EMBODIMENTS

In a device according to an embodiment of the invention, the control circuit comprises a processing unit to supply modulation signals MC1, MC2 of control signals of said legs and a regulating circuit 20 associated with a module for determining a general control component CG. The control circuit comprises voltage signal inputs to supply said regulating circuit with signals representative of voltages V0, between said positive, negative and intermediate voltage lines, or of the variations of the intermediate voltage ΔV0, and current signal inputs to supply the regulating circuit 20 with current signals IS123 representative of output currents of the converter legs.

The regulating circuit and the module for determining the general control component determine the general control component CG according to said modulation signals MC1, to said signals representative of voltage V0 and ΔV0 and to said signals representative of currents IS123 to take part in regulation of the intermediate voltage V0.

Figure 1:
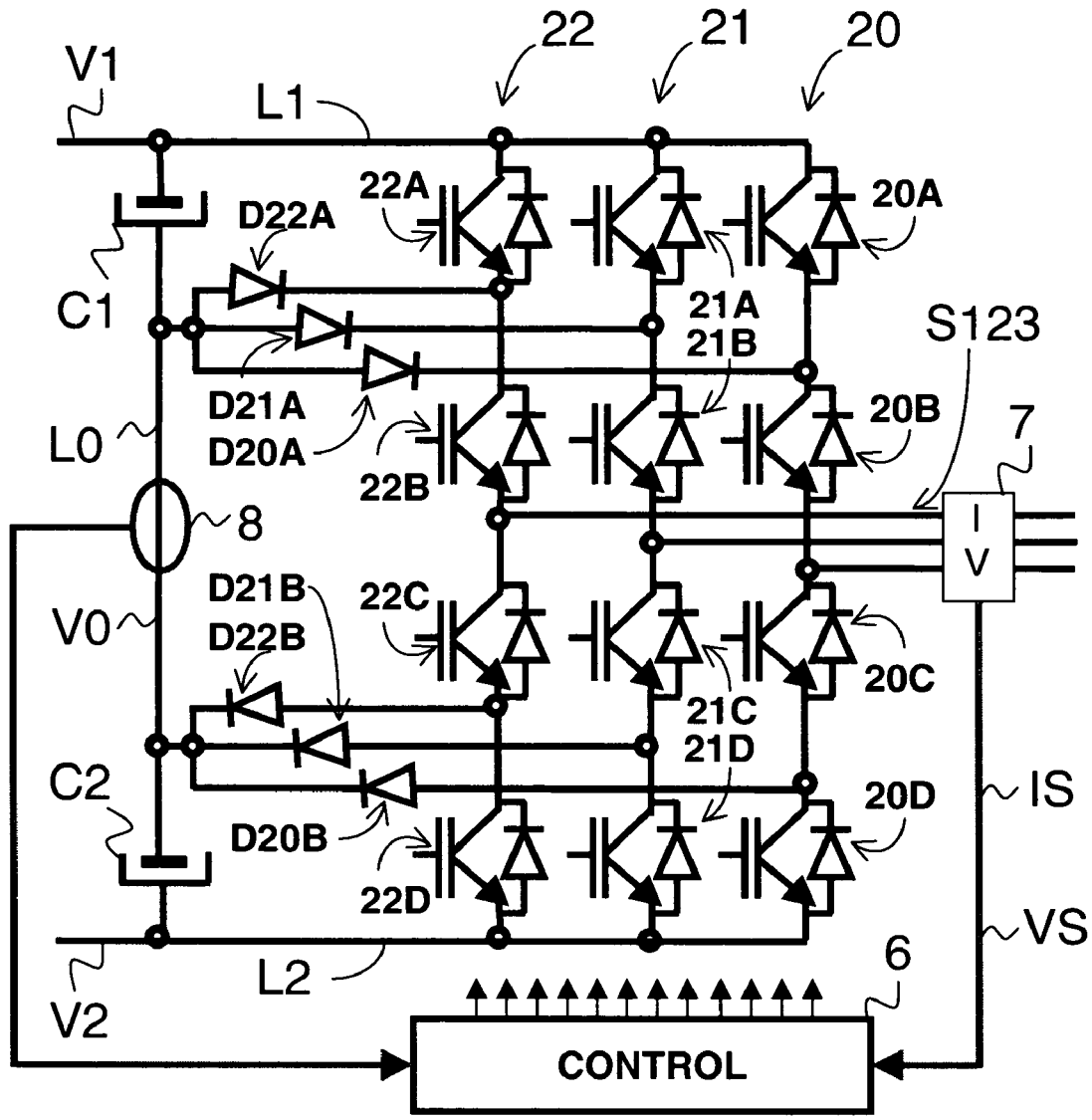
FIG. 1 represents a diagram of a converter of known type.
Figure 2:
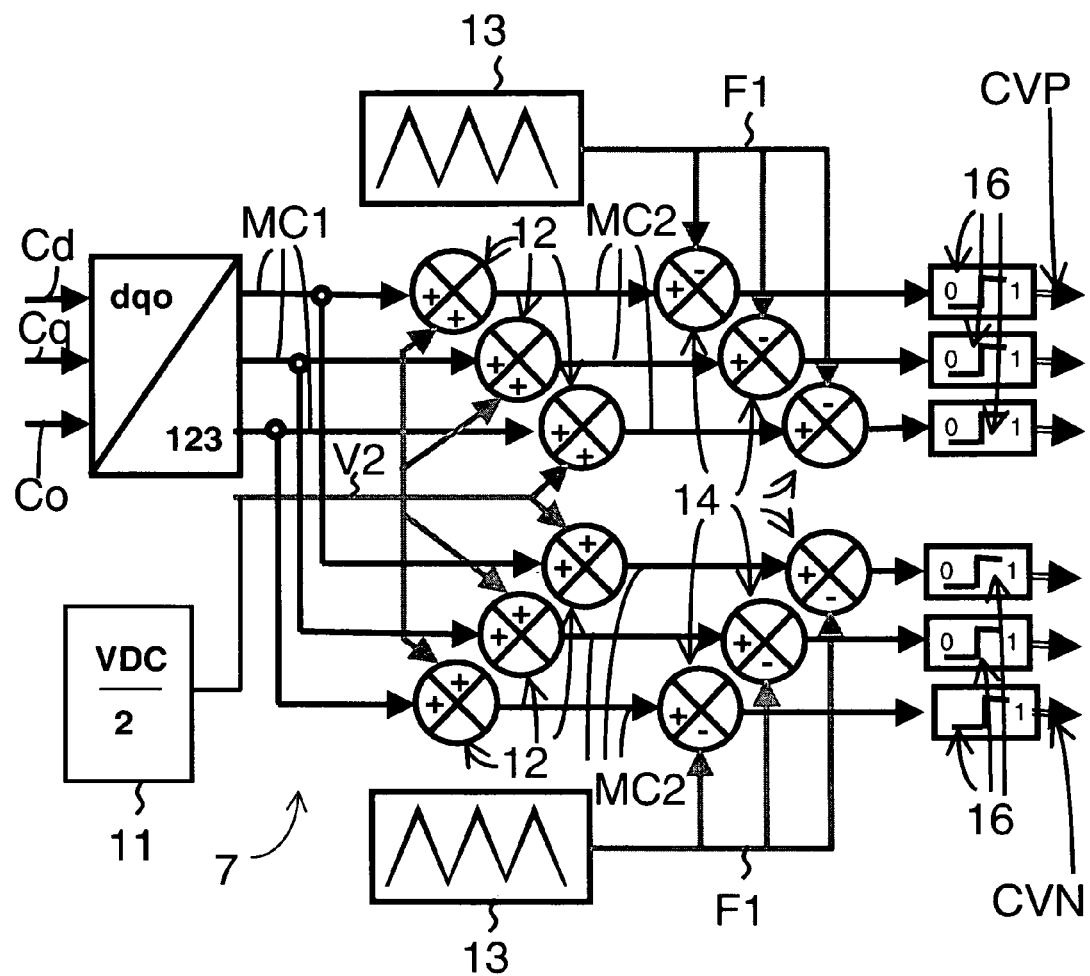
FIG. 2 represents a block diagram of a control circuit of a converter of known type.
Figure 3:
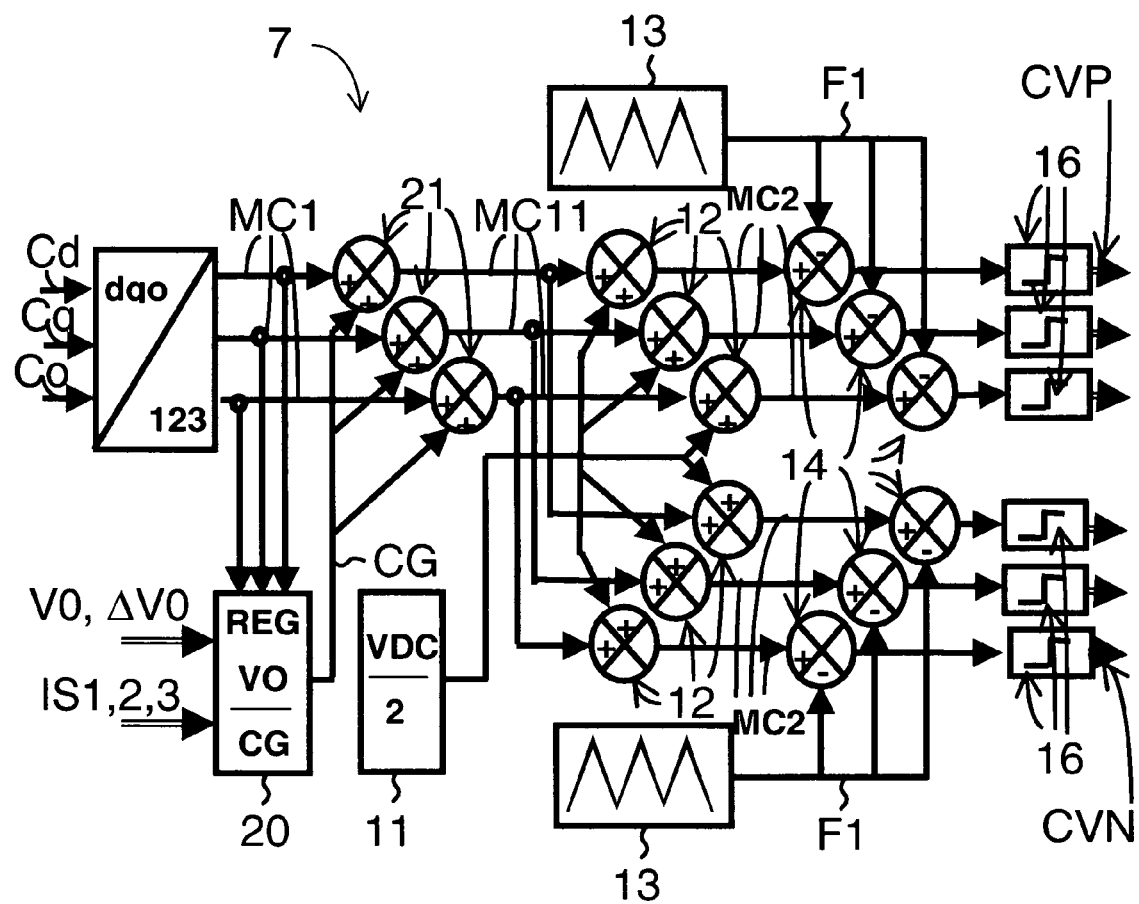
FIG. 3 represents a diagram of a control device according to an embodiment of the invention.
Figure 4:
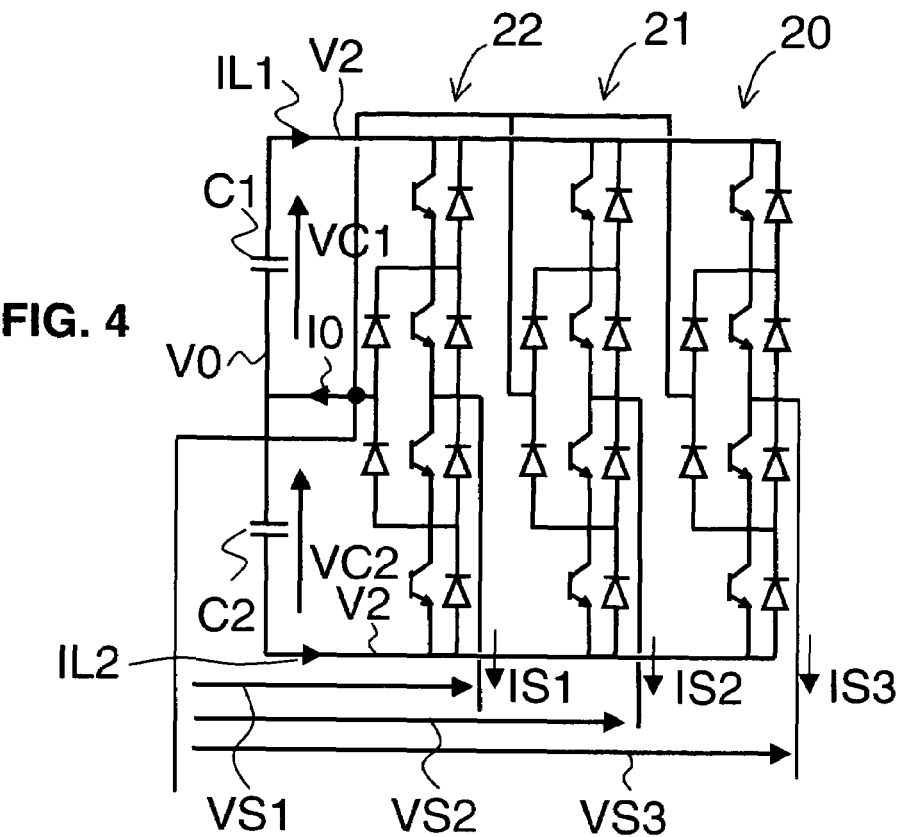
FIGS. 4 to 7 represent modelling diagrams for a device according to an embodiment of the invention.

A block diagram of such a device is represented in FIG. 3. The module containing the regulating circuit 20 and the circuit for determining the general control component CG receives the modulation signals MC1, the signals representative of voltage V0 or ΔV0 and the signals representative of currents IS123. The circuit 20 supplies the general control component CG to operators 21 to modify the modulation signals MC1. Modulation signals MC11 thus modified by the general control component CG are supplied to the operators 12 to continue processing of the modulation signals of the legs.

Thus, a converter comprises a device for measuring the currents IS123 arranged on output conductor lines and connected to said control circuit to supply signals representative of currents to the module for determining the general control component CG and to the regulating circuit 20 to be used in determining the general control component regulating the intermediate voltage ΔV0.

Figure 5:
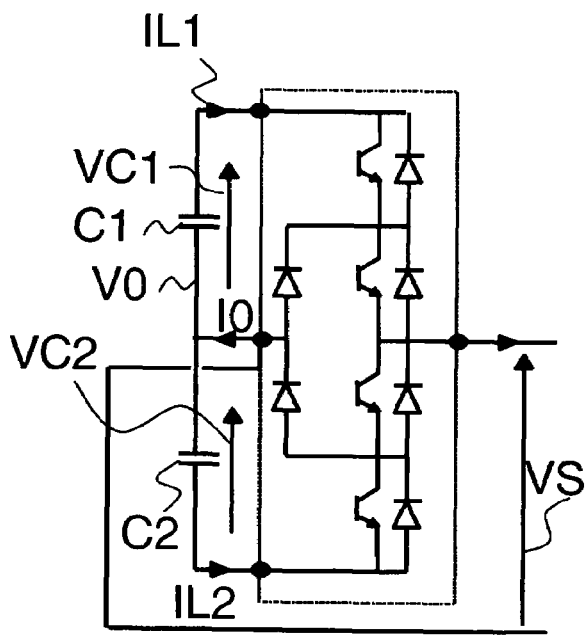
Figure 6:
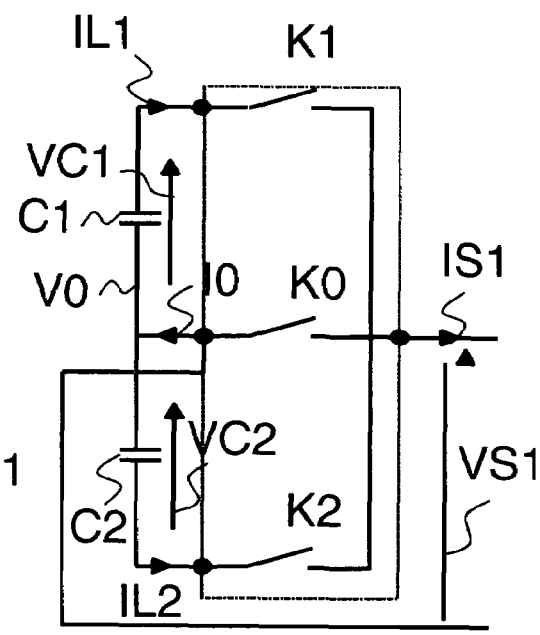
Figure 7:
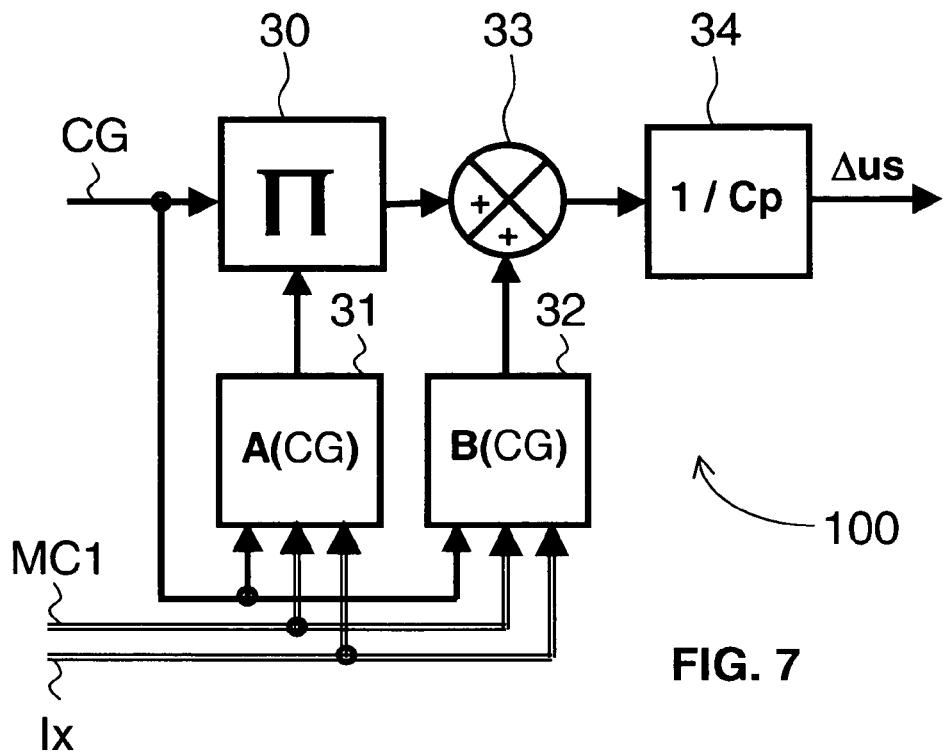

FIGS. 4 to 7 represent modelling diagrams of operation of the converter legs and of regulation of the intermediate voltage variation. The current I0 on the common voltage point V0 is the sum of the currents of the two voltage lines IL1 and IL2 supplying the legs 20, 21, 22. Output voltages VS1, VS2, VS3 are referenced with respect to the common point V0. Its output currents IS1, IS2 and IS3 are supplied by the currents IL1 and IL2 of which they constitute a sum of the positive or negative currents according to the signs of the output voltages controlled by modulation signals. In FIG. 5 a single cubicle with one leg is represented to introduce an equivalent electrical modelling of FIG. 6.

Thus, in a first equating example (1), the current in the common point I0 can be expressed as a function of quantities P and E respectively corresponding to the instantaneous power on output of the converter and to the DC line voltage on input of the converter. This current value is dependent on a first product sum comprising modulation signals MC1, and output current values and controlled by the signs of the modulation signal and on a second sum comprising a product of a general control component CG and of a sum of output currents controlled by the sign of the modulation signals.

$$i_0 = \frac{P}{E} + 2\sum_{k=1}^{3}(MC1_k Sng_k i_k) + CG 2\sum_{k=1}^{3}(Sng_k i_k) \quad (1)$$

with $Sng_k = 1$ for $MC1_k > 0$ $Sng_k = 0$ for $MC1_k < 0$

This modelling can be used with reciprocal functions for controlling the voltage V0, since reducing the current variation in I0 also implies reducing the voltage variation ΔV0. A modelling of this kind is represented by a circuit 100 in FIG. 7 with a product module 30 receiving the component CG and the result of a first combination 31 dependent on the component CG of the modulation signals and on the output currents IS123 corresponding to Ix in the equation. A second combination 32 receives the component CG of the modulation signals and of the output currents IS123. The result of the product module 30 and the result of the second combination are applied to a sum operator 33 and then to a filter 34. This modelling shows that the system is non-causal and recursive. A corrector defined with respect to this model can present a risk of instability in a dynamic operating mode.

In a preferred embodiment of the invention another approximated modelling 101 enables a good stability in dynamic operating mode. This modelling can be represented by an equation as set out below.

$$i_0 = |MC1_1 + CG|i_1 + |MC1_2 + CG|i_2 + \ldots + |MC1_x + CG|i_x \approx \quad (2)$$
$$(MC1_1 + CG)^2 i_1 + (MC1_2 + CG)^2 i_2 + \ldots + (MC1_x + CG)^2 i_x$$

$$i_0 \approx \sum_{k=1}^{3}(MC1_k^2 i_k) + CG * 2\sum_{k=1}^{3}(MC1_k i_k)$$

$$i_0 \approx A' + B' MC1$$

This modelling is based on product sums of absolute values. It leads in particular to making the initial system causal and non-recursive. A corrector defined with this approximation of the initial system enables dynamic control of regulation of the intermediate voltage V0 of the common point to be supported correctly.

Figure 8:
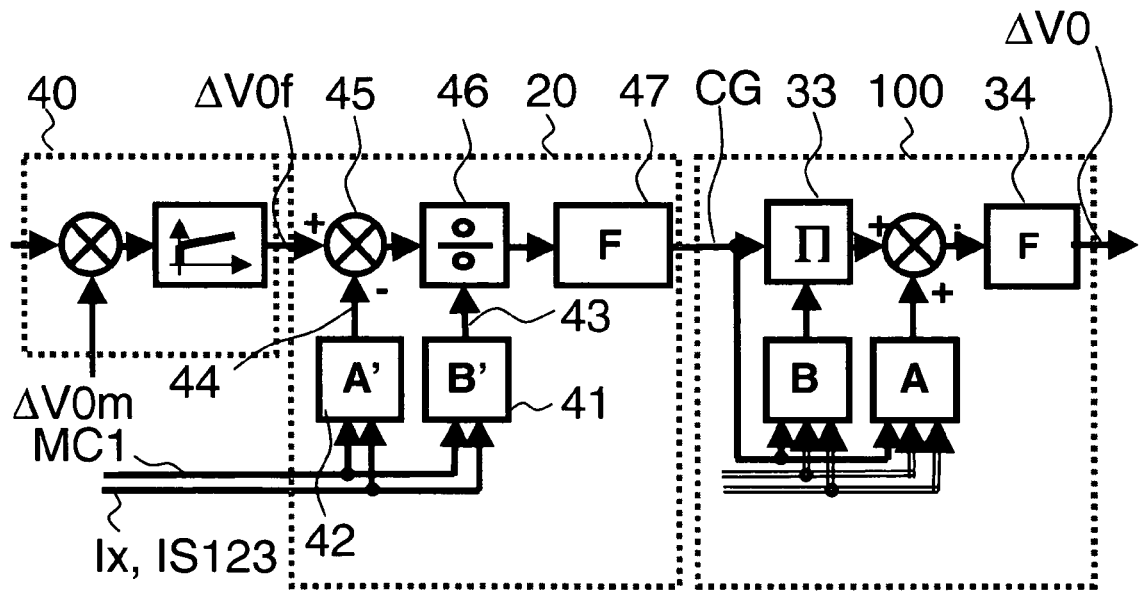
FIGS. 8 and 9 represent diagrams of regulating modules of control devices according to first embodiments of the invention.

FIG. 8 represents a block diagram of a regulating circuit 20 of a control device according to a first embodiment of the invention. In the diagram a correction or balancing circuit 40 conditions a signal of the measured intermediate voltage variation ΔV0m to supply such a signal ΔV0f. The signal ΔV0f and the modulation signals MC1 and current signals Ix or IS123 are supplied to a regulating circuit 20.

The regulating circuit 20 comprises a first regulating module 41 processing a first combination of a product of modulation signals MC1 and output currents IS123, the general control component being dependent on a signal 43 representative of said first combination and of a signal representative of an intermediate voltage variation ΔV0, ΔV0m or ΔV0f.

The regulating circuit 20 preferably comprises a second regulating module 42 processing a second combination of a product of squared modulation signals MC1 and output currents IS123, and supplying a signal 44 representative of said processing. An operator 45 performs the difference between the voltage variation signal ΔV0, ΔV0m or ΔV0f and the signal 44, and an operator 46 performs a quotient between the result of the operator 45 and the signal 43. Therefore, the general control component CG is then dependent on a signal representative of a quotient between a difference of said second combination compared with a signal representative of a variation of the intermediate voltage and said first combination. A filtering module improves the functioning of the system by filtering the general control component output signal.

Figure 9:
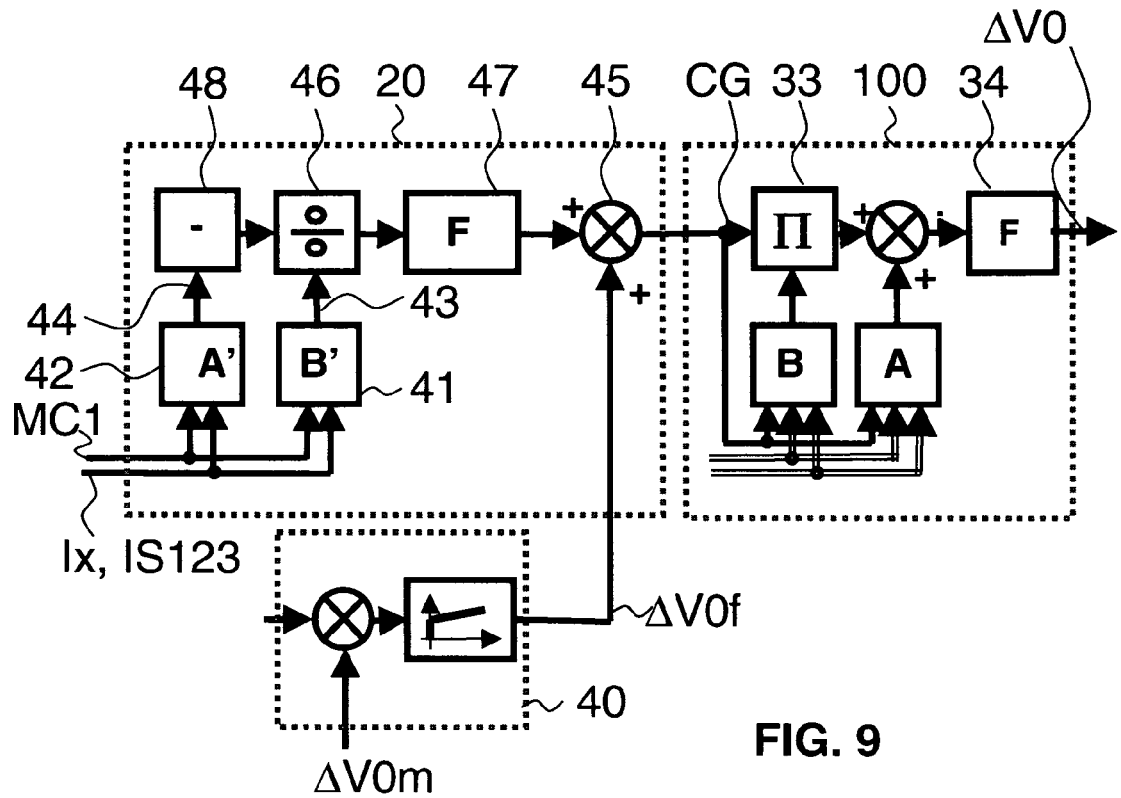

In the embodiment of FIG. 9, the circuit 40 supplies a conditioned signal ΔV0m or ΔV0f to an operator 45 arranged on output of the regulating circuit 20 and connected to the circuit 100. The modified circuit 20 comprises an operator 48 that reverses the signal supplied by the operator 42 before applying it to the operator 46. The operator 45 supplies a general control component CG according to a signal representative of an output signal of the module 46 and of the output signal of the circuit 40. The correction or balancing circuit 40 can also be integrated in the regulating circuit 20.

Figure 10:
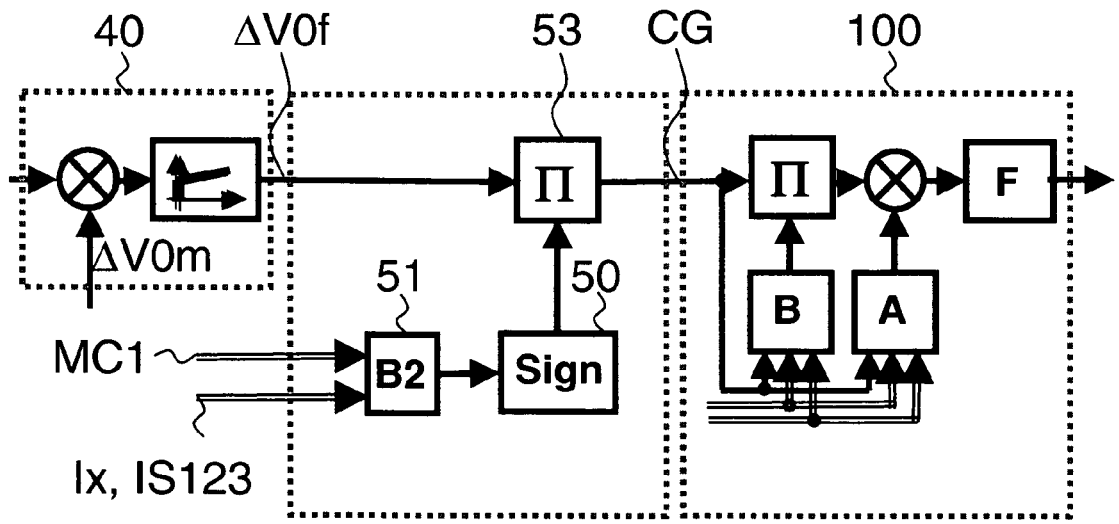
FIG. 10 represents a diagram of a regulating module of a control device according to a second embodiment of the invention.

FIG. 10 represents an alternative embodiment of a regulating module of a control device according to a second embodiment of the invention. The regulating circuit 20 comprises a detection module 50 detecting the sign of a result of a regulating module 51 performing a combination of a product of modulation signals MC1 and output currents IS123. An operator 53 performs the product between the voltage variation signal ΔV0, ΔV0m or ΔV0f and a signal supplied by the module 50. The general control component is dependent on a signal representative of a product between a signal representative of said sign and a signal representative of a variation of the intermediate voltage.

Figure 11:
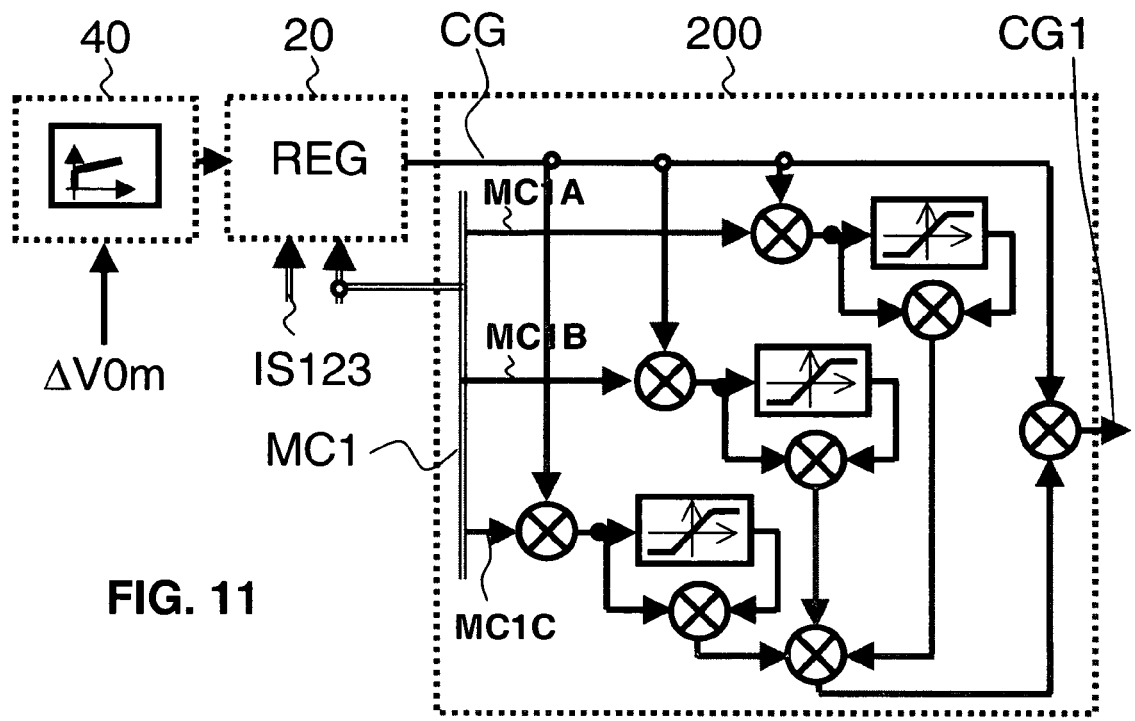
FIG. 11 represents a diagram of a saturation processing module of a control device according to an embodiment of the invention.
Figure 12:
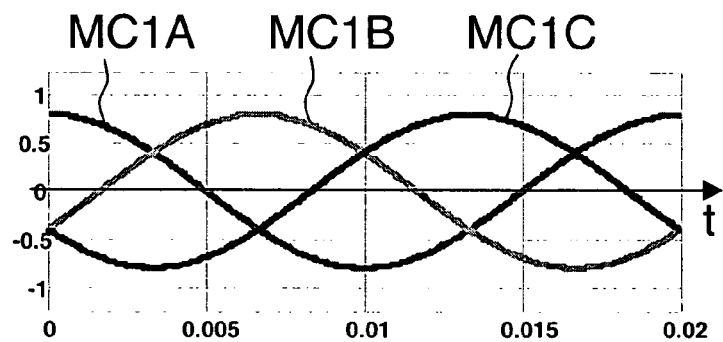
FIG. 12 illustrates modulation signals on which regulation of a device according to an embodiment of the invention can be applied.
Figure 13:
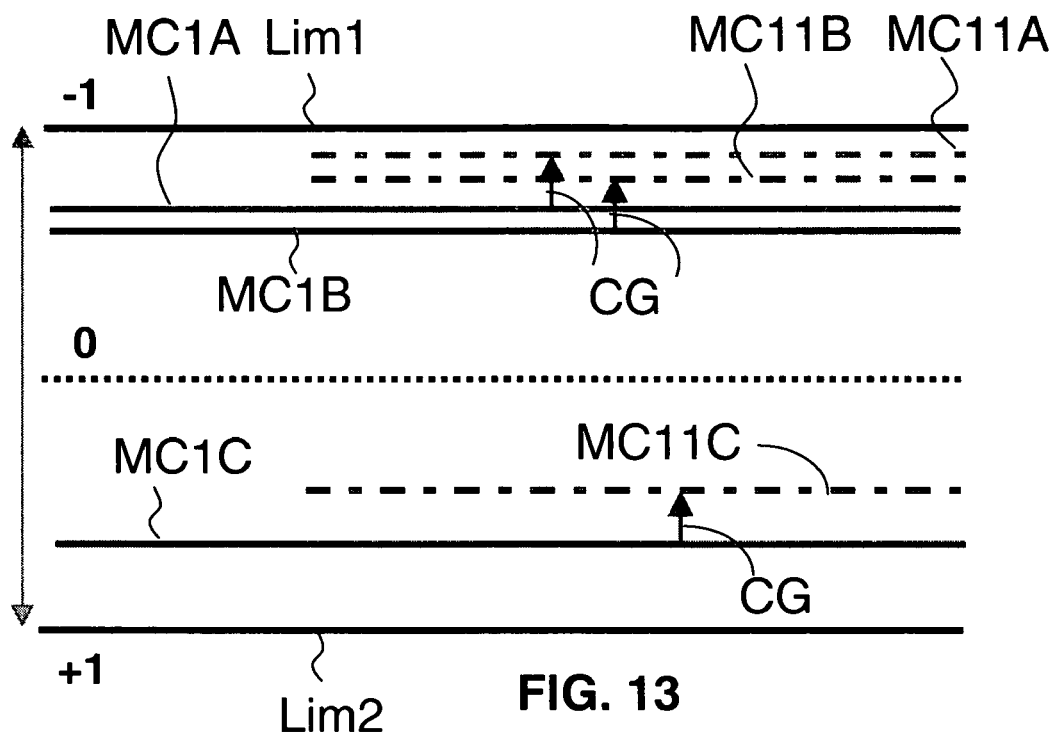
FIG. 13 illustrates modulation signals on which regulation of a device according to an embodiment of the invention with a general control component can be applied.

In the diagram of FIG. 11, a device according to an embodiment of the invention comprises a saturation overshoot risk control circuit 200. This circuit comprises limiting modules 201, 202 and 203 to check the risk of overshoot for each modulation signal respectively MC1A, MC1B, MC1C and to impose limiting in the event of overshoot. FIG. 12 shows examples of modulation signals MC1 for example the signals MC1A, MC1B, MC1C. In FIG. 13 a general control component CG for regulation is applied to all the signals MC1A, MC1B, MC1C to supply signals MC11A, MC11B, MC11C representing the signals MC11 of FIG. 3.

In a particular embodiment, the general control component CG intended for regulation of the intermediate voltage variation also comprises over-modulation signals to reduce the power losses and to reduce the voltage of the voltage lines V1 and V2, over-modulation consisting in forcing turn-on of the power semi-conductors for a preset time.

In this case, determination of the general control component CG uses a circuit controlling an over-modulation OM to supply a general control component comprising regulation signals of mid-point voltage V0, ΔV0 and over-modulation control signals OM.

Figure 14:
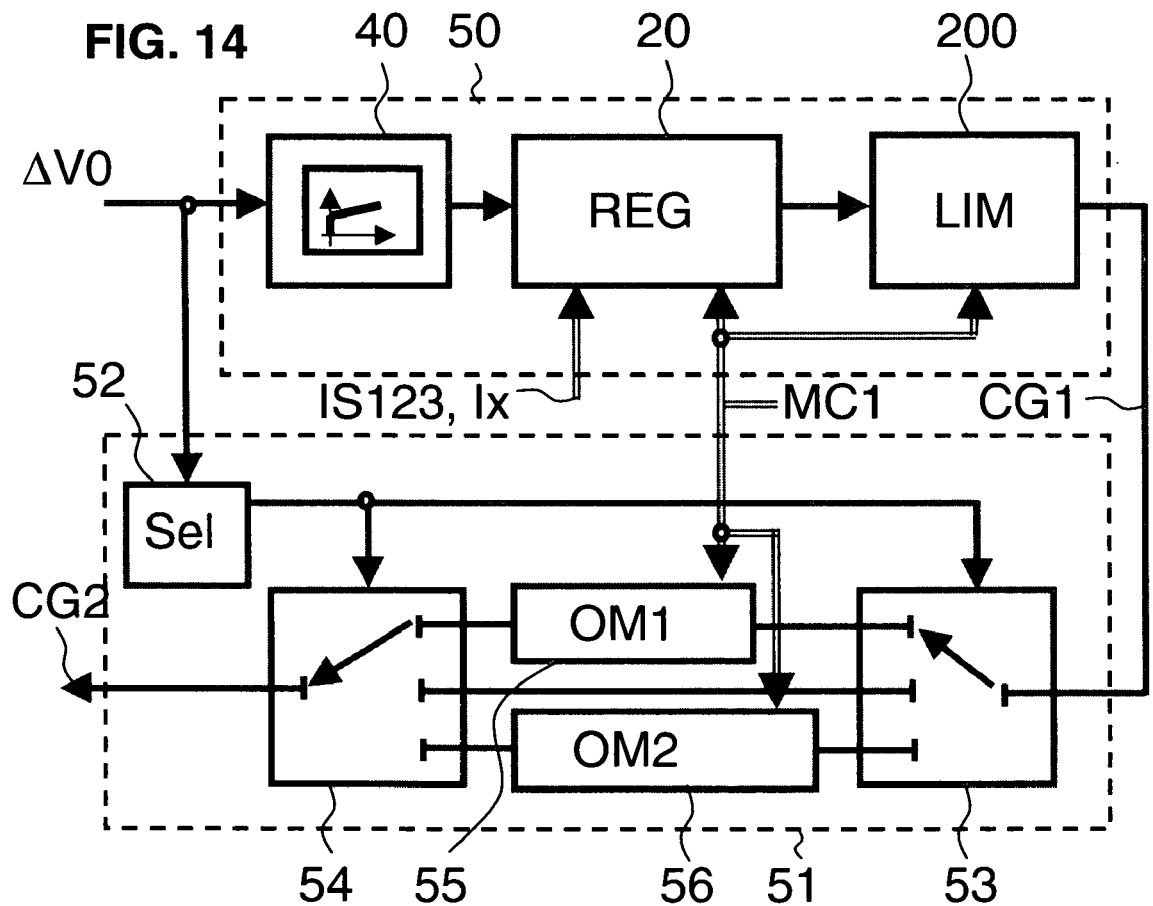
FIG. 14 represents a diagram of regulating modules of a control device according to an embodiment of the invention with over-modulation processings added to regulation of the intermediate voltage.

In FIG. 14, a first unit 50 regulates the common point intermediate voltage variation ΔV0 by supplying a first general control component signal CG1, then a second unit 51 adds an over-modulation OM to the general component signal to supply a control component signal CG2 comprising regulation of the intermediate voltage variation ΔV0 and of over-modulation OM.

The control circuit, in particular in the unit 51, comprises a module 52 controlling signal priority, the regulation signals taking priority over the over-modulation signals. For example in case of incompatibility between regulation and over-modulation, priority is given to regulation.

The over-modulation control unit 51 positions the semi-conductors of the legs during over-modulation to supply a voltage according to a first voltage value corresponding to the voltage of the positive line V1, a second voltage value corresponding to the voltage of the negative line V2, or a third voltage value corresponding to the mid-point value V0.

Preferably, said over-modulation control unit 51 positions the semi-conductors of the legs during over-modulation according to a modulation signal closest to the signals representative of said first positive voltage V1, of said second negative voltage V2, or of said intermediate voltage V0.

Advantageously, said over-modulation control unit 51 positions the semi-conductors of the legs during over-modulation according to a modulation signal modified by a regulation signal, said modified modulation signal being closest to signals representative of said first positive voltage V1, of said second negative voltage V2, or of said intermediate voltage V0.

For example, selection modules 53 and 54 controlled by the module 52 select over-modulation values OM1 or OM2 applied to the general control component by modules 55 or 56 or no over-modulation.

Figure 15:
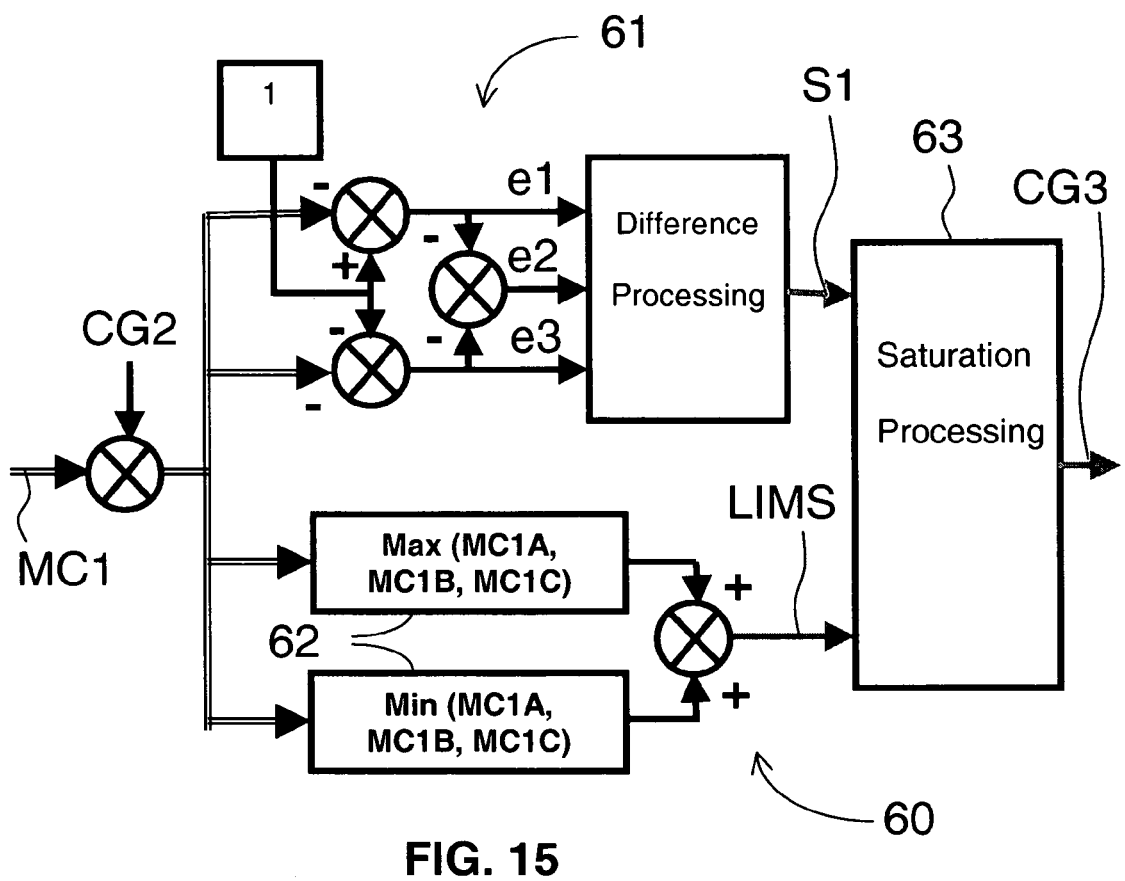
FIG. 15 represents a diagram of a limiting and saturation risk processing module.

Said over-modulation control unit 51 comprises a module controlling modulation signal saturation risks. FIG. 15 shows a saturation limiting processing circuit 60. First modules 61 determine differences between the general control component CG2 and setpoints. Modules 62 determine saturation limit values LIMS according to the modulation signals MC1. Then a module 63 processes the saturation risks according to limiting signals.

Figure 16:
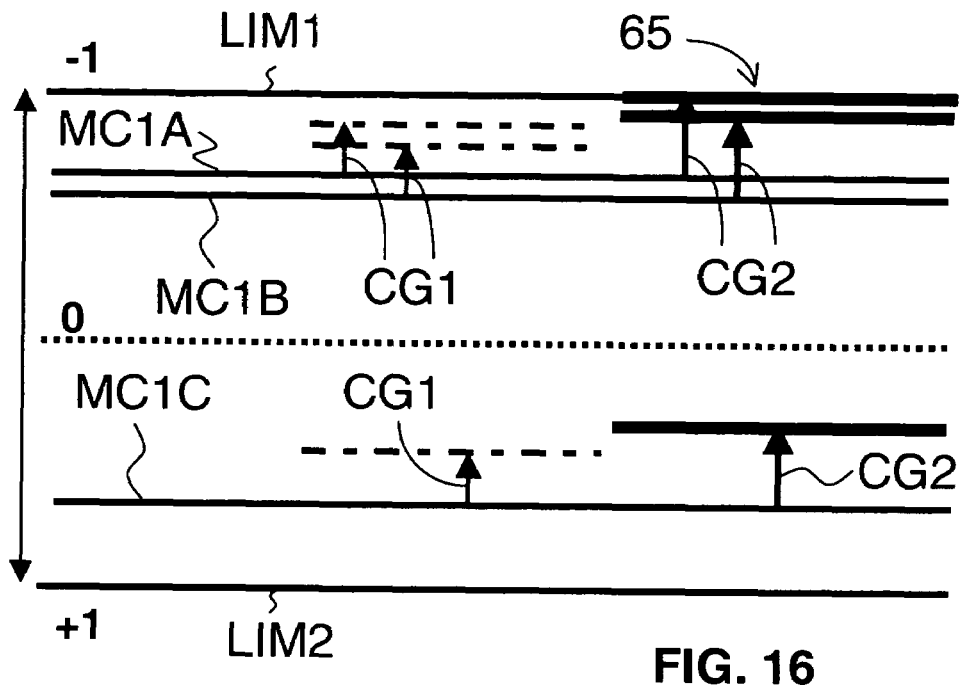
FIG. 16 illustrates modulation signals on which regulation and over-modulation of a device according to an embodiment of the invention with a general control component is applied.

In FIG. 16, modulation signals MC1A, MC1B, MC1C are positioned, with general control component signals CG1 dependent on regulation of the intermediate voltage variation and with general control component signals CG2 dependent on said regulation and on over-modulation. In this figure, over-modulation imposes the maximum value of the positive value on the modulation signal MC1A at the point 65.

Figure 17:
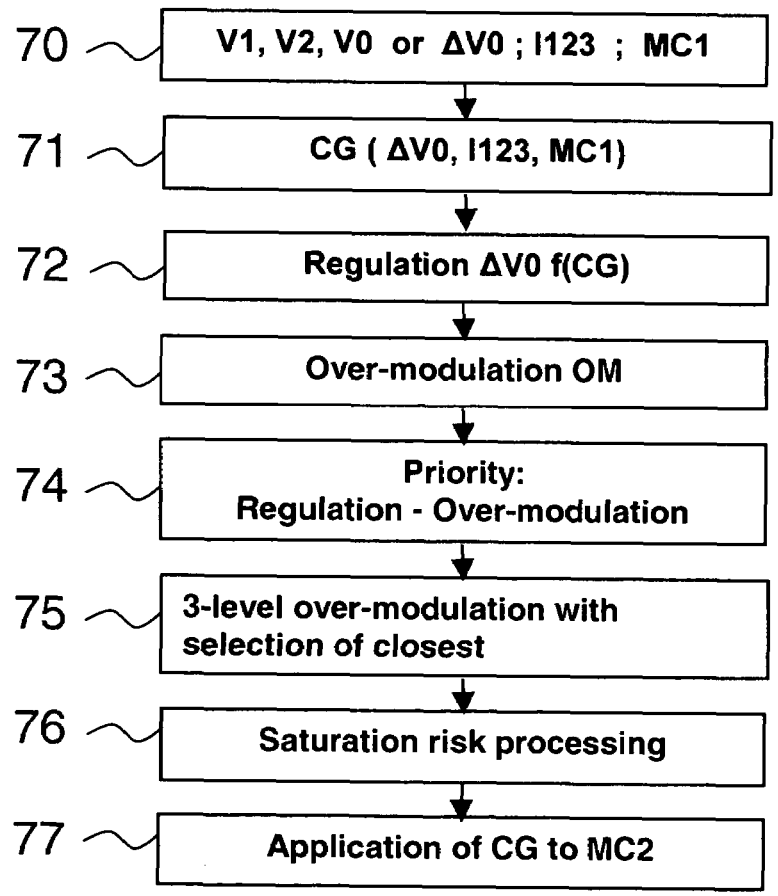
FIG. 17 represents a flowchart of a method according to an embodiment of the invention.

FIG. 17 represents a flowchart of a method according to an embodiment of the invention.

The method comprises a signal measurement or acquisition step 70. Then, in a step 71, determination of a general control component CG is performed according to modulation signals MC1, to signals representative of voltages or of voltage variation ΔV0 of the intermediate line V0 and/or the positive voltage V1 and negative voltage V2 lines, and to signals representative of currents in output conductors IS123. In a step 72, regulation of the intermediate line voltage variation is performed via the general control component CG.

A step 73 enables the over-modulation OM to be applied to the general control component to be processed. Thus, the general control component is also determined according to over-modulation processing. In a step 74, the general control component is determined with priority to regulation of the intermediate voltage over over-modulation.

Preferably, in a step 75, processing of the general control component is performed on three levels and applies selection of a closest modulation signal with respect to signals representative of positive, negative or intermediate voltages. A step 76 processes saturation risks and a step 77 applies the general control component to modulation signals.

Conversion devices according to embodiments can be in particular inverters, uninterruptible power supplies, variable speed drives, unidirectional or bidirectional power converters, or frequency converters.

The invention applies in particular to three-phase converters with three DC voltage levels with three or four legs, but other converters having a different number of legs and/or of phases may be concerned.

The semi-conductors of these converters are advantageously insulated gate bipolar transistors called IGBT but other types of semi-conductors can be used. The legs can comprise several semi-conductors connected in series and/or in parallel according to the voltages, currents or electric powers used. For example, the input or output voltages can range from a few tens of volts to a thousand volts for low voltage power system applications or have voltages of several thousands of volts in particular in medium/high voltage applications. The input or output currents can range from a few amperes to more than a thousand amperes.

In technical language, the legs of the converter can be also called arms, branches, or stages.

The invention claimed is:

1. An electric power converter comprising:
a DC power supply comprising a first line of positive voltage, a second line of negative voltage, and a third line of intermediate voltage connected to a first electrode of a plurality of filtering capacitors, a second electrode of said filtering capacitors connected to said first line and said second line, respectively,
conversion means having at least three stages connected between at least two of said positive, negative, and intermediate voltage lines, and outputs for supplying at least one output voltage,
control means for controlling turn-on of said stages of the conversion means, said control means comprising processing means for supplying composite modulation signals of control signals to said stages, said control means comprising:
regulating means for determining a modulation control signal,
voltage signal inputs for supplying said regulating means with at least one of (1) signals representative of voltages between at least two of said positive, negative, and intermediate voltage lines, and (2) at least one signal corresponding to a variation in such intermediate voltage, and
current signal inputs for supplying said regulating means with current signals representative of output currents of the converter stages,
wherein said regulating means determine the modulation control signal according to values of initial modulation signals corresponding to such control signals, according to said signals representative of voltages between at least two of said positive, negative, and intermediate voltage lines, and according to said current signals, and
such composite modulation signals correspond to a combination of at least such modulation control signal and such initial modulation signals.

2. The electric power converter according to claim 1, wherein said regulating means comprise a first regulating module for processing a first combination of such initial modulation signals and of such output currents, the modulation control signal corresponding to a signal representative of said first combination and a signal representative of a variation of the intermediate voltage.

3. The electric power converter according to claim 2, wherein said regulating means comprise a second regulating module for processing a second combination of squared initial modulation signals and of such output currents, the modulation control signal corresponding to said second combination and said first combination.

4. The electric power converter according to claim 2, wherein said regulating means comprise a module for detecting a sign of a result of said first combination, the modulation control signal being dependent on a signal representative of said sign and a signal representative of a variation of the intermediate voltage.

5. The electric power converter according to claim 1, wherein the processing means comprise means for determining such modulation control signal, and said means for determining such modulation control signal comprise means for controlling an over-modulation to supply a modulation control signal comprising mid-point voltage regulation signals and over-modulation control signals.

6. The electric power converter according to claim 5, wherein said over-modulation control signals comprise means for controlling signal priority, regulating signals taking priority over over-modulation signals.

7. The electric power converter according to claim 5, wherein said stages of said conversion means are semiconductor stages, and
said over-modulation control means control the semi-conductors of the stages during over-modulation to supply a voltage according to a first voltage value corresponding to the voltage of the positive line, a second voltage value corresponding to the voltage of the negative line, or a third voltage value corresponding to the mid-point voltage.

8. The electric power converter according to claim 7, wherein said over-modulation control means control the semi-conductors of the stages during over-modulation according to one of such initial modulation signals closest to signals representative of such positive voltage of the first line, such negative voltage of the second line, or such intermediate voltage of the third line, respectively.

9. The electric power converter according to claim 8, wherein said over-modulation control means control the semi-conductors of the stages during over-modulation according to a modulation signal modified by a regulation signal, said modified modulation signal corresponding to signals representative of such positive voltage of the first line, such negative voltage of the second line, or such intermediate voltage of the third line, respectively.

10. The electric power converter according to claim 8, wherein the over-modulation control means comprise means for controlling saturation risks of the modulation signals.

11. An electric power converter comprising:
a control device having control means for controlling turn-on of power semi-conductor stages,
a DC power supply comprising a first line of positive voltage, a second line of negative voltage, and a third line of intermediate voltage connected to a first electrode of a plurality of filtering capacitors, a second electrode of said filtering capacitors connected to said first line and to said second line, respectively,
conversion means having at least three stages connected between at least two of said lines of positive, negative, and intermediate voltages, and outputs for supplying at least one output voltage,
control means for controlling turn-on of said stages of the conversion means according to composite modulation signals corresponding to a modulation control signal, said control means comprising:
regulating means for determining a modulation control signal,
voltage signal inputs for supplying said regulating means with at least one of (1) signals representative of voltages between at least two of said positive, negative, and intermediate voltage lines, and (2) a signal corresponding to variations of such intermediate voltage, and
current signal inputs for supplying said regulating means with current signals representative of output currents of the converter stages,
wherein said regulating means determines the modulation control signal according to values of initial modulation signals corresponding to such control signals, according to said signals representative of voltages between at least two of said positive, negative, and intermediate voltage lines, and according to said current signals,
such composite modulation signals correspond to a combination of at least such modulation control signal and such initial modulation signals, and
said electric converter further comprises current measuring means connected to output conductor lines and connected to said control device, said current measuring means for supplying signals representative of currents to means for determining the modulation control signal and to regulating means for determining the modulation control signal regulating the intermediate voltage.

12. A method for controlling an electric power converter, said electric power converter comprising:
a DC power supply comprising a first positive voltage line, a second negative voltage line, and a third intermediate voltage line connected to a first electrode of a plurality of filtering capacitors, a second electrode of said filtering capacitors connected to said first line and to said second line, respectively, conversion means having at least three stages connected between at least two of said positive, negative, and intermediate voltage lines, and outputs for supplying at least one output voltage, and control means for controlling tin-on of said stages of the conversion means, said method comprising:

receiving control signals at a said control means for controlling said stages of said conversion means, generating initial modulation signals corresponding to such control signals, generating a modulation control signal corresponding to at least one of (1) such initial modulation signals, (2) signals representative of voltages between any two of the intermediate line, the positive line, and the negative voltage line, and to (3) signals representative of currents in output conductors, generating a composite modulation signal corresponding to a combination of the initial modulation signals and the modulation control signal, and regulating a voltage variation of the intermediate line via the composite modulation signal.

13. The method for controlling an electric power converter according to claim 12, wherein the modulation control signal is also determined according to over-modulation processing.

14. The method for controlling an electric power converter according to claim 13, wherein the modulation control signal is determined with regulation of the intermediate voltage taking priority over over-modulation.

15. The method for controlling an electric power converter according to claim 13, wherein over-modulation processing is performed on three levels corresponding to the positive, negative, and intermediate voltages, respectively.

* * * * *